(12) United States Patent
Keipert et al.

(10) Patent No.: US 8,066,786 B2
(45) Date of Patent: Nov. 29, 2011

(54) COATED ABRASIVE DISC AND METHOD OF MAKING THE SAME

(75) Inventors: Steven J. Keipert, Somerset, WI (US); Jaime M. Manalo, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/018,409

(22) Filed: Jan. 23, 2008

(65) Prior Publication Data

US 2008/0152856 A1    Jun. 26, 2008

Related U.S. Application Data

(63) Continuation-in-part of application No. 11/613,367, filed on Dec. 20, 2006, now abandoned.

(51) Int. Cl.
*B24D 3/02* (2006.01)
*B24D 3/28* (2006.01)
*B24D 11/02* (2006.01)

(52) U.S. Cl. .............. 51/297; 51/293; 51/298

(58) Field of Classification Search ............ 51/298, 51/285, 307–309, 297, 293; 451/526, 532, 451/533; 428/64.1
See application file for complete search history.

(56) References Cited

U.S. PATENT DOCUMENTS

| | | | |
|---|---|---|---|
| 2,138,882 A * | 12/1938 | Robie | 451/536 |
| 2,219,853 A | 10/1940 | Tone | |
| 2,492,143 A | 12/1949 | Gipple et al. | |
| 2,520,763 A | 8/1950 | Goepfert et al. | |
| 3,146,560 A * | 9/1964 | Hurst | 451/527 |
| 3,562,968 A | 2/1971 | Johnson et al. | |
| 3,785,094 A | 1/1974 | Holzhauer | |
| 4,314,827 A | 2/1982 | Leitheiser et al. | |
| 4,405,341 A | 9/1983 | Jaschek et al. | |
| 4,751,138 A | 6/1988 | Tumey et al. | |
| 4,836,832 A | 6/1989 | Tumey et al. | |
| 4,903,440 A | 2/1990 | Larson et al. | |

(Continued)

FOREIGN PATENT DOCUMENTS

BR    9706508-0 A    10/1999

(Continued)

OTHER PUBLICATIONS

"Abrasive Article and Method of Making and Using the Same", U.S. Appl No. 11/554,094, filed Oct. 30, 2006.

(Continued)

*Primary Examiner* — Jerry A Lorengo
*Assistant Examiner* — Jared Wood
(74) *Attorney, Agent, or Firm* — Bradford B. Wright (57) ABSTRACT

A coated abrasive disc has a backing comprising a synthetic woven fabric having a first major surface with a presize disposed thereon and a second major surface opposite the first major surface and having a backsize disposed thereon. The presize comprises a reaction product of a curable presize precursor comprising: at least one epoxy resin prepared by reaction of epichlorohydrin with at least one of bisphenol A or bisphenol F, polyfunctional (meth)acrylate, novolac resin, imidazole epoxy cure catalyst, dicyandiamide, and a photoinitiator. A glass woven fabric permeated with an at least partially crosslinked saturant is secured to the second major surface by a thermoplastic laminating adhesive disposed between the second major surface of the synthetic woven fabric and the glass woven fabric. A method of making the same is also disclosed.

13 Claims, 1 Drawing Sheet

U.S. PATENT DOCUMENTS

| | | | |
|---|---|---|---|
| 5,127,197 A | 7/1992 | Bruxvoort et al. |
| 5,213,591 A | 5/1993 | Celikkaya et al. |
| 5,286,541 A | 2/1994 | Darjee et al. |
| 5,314,513 A | 5/1994 | Miller et al. |
| 5,316,812 A | 5/1994 | Stout et al. |
| 5,344,688 A | 9/1994 | Peterson et al. |
| 5,355,636 A | 10/1994 | Harmon |
| 5,436,063 A | 7/1995 | Follett et al. |
| 5,437,754 A | 8/1995 | Calhoun |
| 5,560,753 A | 10/1996 | Schnabel et al. |
| 5,573,619 A | 11/1996 | Benedict et al. |
| 5,578,095 A | 11/1996 | Bland et al. |
| 5,580,634 A | 12/1996 | Stout et al. |
| 5,582,625 A | 12/1996 | Wright et al. |
| 5,611,829 A | 3/1997 | Monroe et al. |
| 5,681,612 A | 10/1997 | Benedict et al. |
| 5,695,533 A | 12/1997 | Kardys et al. |
| 5,766,277 A | 6/1998 | DeVoe et al. |
| 5,849,052 A | 12/1998 | Barber, Jr. |
| 5,888,119 A | 3/1999 | Christianson et al. |
| 5,961,674 A | 10/1999 | Gagliardi et al. |
| 5,975,988 A | 11/1999 | Christianson |
| 6,007,407 A | 12/1999 | Rutherford et al. |
| 6,066,188 A | 5/2000 | Benedict et al. |
| 6,077,601 A | 6/2000 | DeVoe et al. |
| 6,228,133 B1 | 5/2001 | Thurber et al. |
| 6,261,328 B1 | 7/2001 | Champagne |
| 6,287,184 B1 | 9/2001 | Carpentier et al. |
| 6,465,076 B2 | 10/2002 | Larson et al. |
| 6,692,547 B2 | 2/2004 | Kim |
| 6,843,815 B1 | 1/2005 | Thurber et al. |
| 6,936,083 B2 | 8/2005 | Thurber et al. |
| 2002/0019199 A1 | 2/2002 | Goers et al. |
| 2003/0200701 A1 | 10/2003 | Koehnle et al. |
| 2005/0120636 A1 | 6/2005 | Kim |
| 2005/0170764 A1 | 8/2005 | Shin |
| 2005/0279029 A1 | 12/2005 | Keipert et al. |
| 2006/0026905 A1 | 2/2006 | Kim |
| 2006/0288648 A1 | 12/2006 | Thurber et al. |
| 2010/0203282 A1 | 8/2010 | Keipert |

FOREIGN PATENT DOCUMENTS

| | | |
|---|---|---|
| CA | 2 457 249 A1 | 2/2004 |
| EP | 0 716 903 A1 | 6/1996 |
| GB | 1 451 331 | 9/1976 |
| GB | 2 182 050 A1 | 5/1987 |
| JP | 1-244840 | 9/1989 |
| JP | 2005-118978 | 5/2005 |
| WO | WO 00/37569 | 6/2000 |
| WO | WO 2009/023499 A1 | 2/2009 |

OTHER PUBLICATIONS

"Coated Abrasive Disc and Method of Making the Same", U.S. Appl. No. 11/613,367, filed Dec. 20, 2006.

Office Action dated Nov. 5, 2007 and received in priority U.S. Appl. No. 11/613,367.

U.S. Appl. No. 60/955,418, entitled "Coated Laminate Abrasive Disc and Methods of Making the Same", Keipert, filed Aug. 13, 2007.

\* cited by examiner

COATED ABRASIVE DISC AND METHOD OF MAKING THE SAME

CROSS-REFERENCE TO RELATED APPLICATION

This application is a continuation-in-part of U.S. application Ser. No. 11/613,367, filed Dec. 20, 2006, now abandoned.

BACKGROUND

In general, coated abrasive discs have abrasive particles secured to a backing. Typically, coated abrasive discs comprise a backing having two opposed major surfaces and an abrasive layer secured to one of the major surfaces. The abrasive layer typically comprises of abrasive particles and a binder that secures the abrasive particles to the backing.

One common type of coated abrasive disc has an abrasive layer formed of a make layer, a size layer, and abrasive particles. In making such a coated abrasive disc, a curable make layer precursor is typically applied to a major surface of a backing and optionally partially cured. Abrasive particles are then at least partially embedded into the (optionally partially cured) curable make layer precursor, and the make layer precursor is sufficiently cured to provide a make layer that secures the abrasive particles to the backing. A curable size layer precursor is then applied over the make layer and abrasive particles, followed by sufficient curing of the size layer precursor to provide a size layer.

Another common type of coated abrasive disc comprises an abrasive layer secured to a major surface of a backing, wherein the abrasive layer is provided by applying a slurry having a curable binder precursor and abrasive particles onto a major surface of a backing, and then sufficiently curing the binder precursor to form an abrasive layer.

Coated abrasive discs may further comprise a supersize layer covering the abrasive layer. The supersize layer typically includes grinding aids and/or anti-loading materials.

Backings used in coated abrasive discs may be treated with one or more applied coatings. Examples of typical backing treatments are a backsize (i.e., a coating on the major surface of the backing opposite the abrasive layer), a presize or a tie layer (i.e., a coating on the backing disposed between the abrasive layer and the backing), and/or a saturant that saturates the backing. A subsize is similar to a saturant, except that it is applied to a previously treated backing.

Depending on the particular choice of abrasive layer and backing (e.g., treated or untreated), the abrasive layer may partially separate from the backing during abrading resulting in the release of abrasive particles. This phenomenon is known in the abrasive art as "shelling". In most cases, shelling is undesirable because it results in a loss of performance. Besides shelling, another important abrasive property is the "cut" (i.e., rate of cut), that is, the amount of material removed from a workpiece over a given period under specific test conditions. Various test methods are used to evaluate cut (e.g., swing arm abrasion or slide action abrasion). Generally, values of cut that are observed with a given coated abrasive disc depend on the particular test method used, so care should be taken when comparing the cut of abrasive articles to ensure that identical test conditions are used.

SUMMARY

In one aspect, the present invention provides a coated abrasive disc comprising an abrasive layer secured to a backing, wherein the backing comprises:

a synthetic woven fabric having a first major surface with a presize disposed on at least a portion thereof and a second major surface opposite the first major surface and having a backsize disposed on at least a portion thereof, wherein the presize comprises a reaction product of a curable presize precursor comprising, based on the total weight of components (a) to (f): (a) from 50 to 90 percent by weight of at least one epoxy resin prepared by reaction of epichlorohydrin with at least one of bisphenol A or bisphenol F; (b) from 1 to 20 percent by weight of at least one polyfunctional (meth)acrylate; (c) from 1 to 10 percent of at least one novolac resin; and an effective amount of (d) imidazole epoxy cure catalyst, (e) dicyandiamide, and (f) photoinitiator;

a glass woven fabric permeated with an at least partially crosslinked saturant; and a thermoplastic laminating adhesive disposed between the second major surface of the synthetic woven fabric and the glass woven fabric, wherein the thermoplastic laminating adhesive secures the synthetic woven fabric to the glass woven fabric; and wherein the abrasive layer comprises a make layer, a size layer, and abrasive particles, and overlays at least a portion of the presize.

In some embodiments, the abrasive layer comprises make and size layers. In some of these embodiments, the coated abrasive disc further comprises a supersize layer overlaying at least a portion of the size layer.

In some embodiments, the abrasive layer comprises abrasive particles dispersed in a binder (e.g., those embodiments resulting from coating a slurry of abrasive particles in a curable binder precursor, and curing the binder precursor).

In some embodiments, the coated abrasive disc comprises a coated abrasive disc.

Abrasive discs according to the present invention are useful for abrading a workpiece.

In another aspect, the present invention provides a method of making a coated abrasive disc, the method comprising:

providing a synthetic woven fabric having a first major surface with a presize disposed on at least a portion thereof and a second major surface opposite the first major surface, wherein the presize comprises a reaction product of a curable presize precursor comprising, based on the total weight of components (a) to (f): (a) from 50 to 90 percent by weight of at least one epoxy resin prepared by reaction of epichlorohydrin with at least one of bisphenol A or bisphenol F; (b) from 1 to 20 percent by weight of at least one polyfunctional (meth)acrylate; (c) from 1 to 10 percent of at least one novolac resin; and an effective amount of (d) imidazole epoxy cure catalyst, (e) dicyandiamide, and (f) photoinitiator;

disposing a backsize on at least a portion of the second major surface;

overlaying a curable make layer precursor on at least a portion of the presize;

applying abrasive particles to the curable make layer precursor;

sufficiently curing the curable make layer precursor to provide a make layer;

overlaying a curable size layer precursor on at least a portion of the make layer and abrasive particles; and sufficiently curing the curable size layer precursor to provide a size layer;

providing a glass woven fabric permeated with an at least partially crosslinked saturant; and securing the synthetic woven fabric to the glass woven fabric with a thermoplastic laminating adhesive disposed between the second major surface of the synthetic woven fabric and the glass woven fabric.

In some embodiments, the synthetic woven fabric is secured to the glass woven fabric with the thermoplastic laminating adhesive before the curable make layer precursor is overlaid on at least a portion of the presize.

Surprisingly, it is found that abrasive discs according to the present invention exhibit a low degree of shelling, while achieving useful levels of other abrasive properties such as, for example, a high ratio of slide action cut to mineral loss.

As used herein, the term "dispersed in" means dispersed substantially throughout; the term "woven fabric" refers to a knit or woven cloth, and does not include felts or nonwovens; the adjective "thermoplastic" means having the property of softening or fusing when heated and of hardening and becoming rigid again when cooled (thermoplastic materials can typically be re-melted and cooled time after time without undergoing appreciable chemical change); the term "(meth) acrylate" refers to acrylate and/or methacrylate; the term "thermosetting" means having the property of becoming permanently hardened (e.g., by a chemical crosslinking reaction) when heated or otherwise cured; and the terms "based on solids" and "on a solids basis" refer to the weight of material components less volatile solvent (including water).

DETAILED DESCRIPTION

Figure 1:
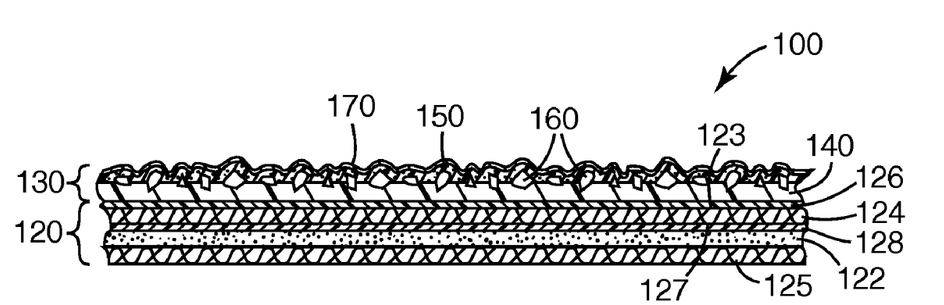
The drawing is a cross-sectional schematic view of an exemplary coated abrasive disc according to the present invention.

Referring now to the drawing, exemplary coated abrasive disc 100 has abrasive layer 130 secured to backing 120. Abrasive layer 130 has make layer 140 overlaid by size layer 150, and which together secure abrasive particles 160 to backing 120. Optional supersize layer 170 overlays size layer 150. Backing 120 has presize 126 on first major surface 123 of synthetic woven fabric 124. Backsize 128 on second major surface 127 of synthetic woven fabric 124 contacts thermoplastic adhesive 122, which secures glass woven fabric 125 (permeated with saturant (not shown)) to synthetic woven fabric 124.

The synthetic woven fabric generally consists essentially of woven synthetic fibers and blends thereof. Examples of useful synthetic fibers include polyester, acrylic, polyamide, polyolefin, and polyimide fibers.

Typically, the synthetic woven fabric has a basis weight in a range of from 2 to 20 ounces (oz) per square yard (70 to 680 grams per square meter (i.e., $g/m^2$)), for example, a basis weight of from 4 to 15 ounces per square yard (140 to 510 $g/m^2$) or even a basis weight of from 5 to 13 ounces per square yard (170 to 360 $g/m^2$); although other basis weights may be used.

The presize comprises a reaction product of a curable presize precursor. The curable presize precursor comprises at least one epoxy resin prepared by reaction of epichlorohydrin with at least one of bisphenol A or bisphenol F, of at least one polyfunctional (meth)acrylate, at least one novolac resin, imidazole epoxy cure catalyst, dicyandiamide, and photoinitiator.

The at least one epoxy resin prepared by reaction of epichlorohydrin with at least one of bisphenol A or bisphenol F is present, based on the total weight of the curable presize precursor, in an amount of from 50 to 90 percent by weight (for example, from 50, 55, 60, or 65 percent by weight up to 70, 75, 80, 85, or even 90 percent by weight) of at least one epoxy resin prepared by reaction of epichlorohydrin with at least one of bisphenol A or bisphenol F. Typically, the epoxy resin(s) has an average epoxy functionality of two, although higher and lower functionalities may also be useful. The epoxy resin(s) may be liquid or solid. Whether liquid or solid, the epoxy resin(s) may be chosen to be soluble in compositions according to the present invention. In some instances, beating compositions according to the present invention may facilitate dissolution of the epoxy resin(s). Examples of useful epoxy resins include the epoxy resins formed by reaction of bisphenol A or bisphenol F with epichlorohydrin, and mixtures of such resins. Examples of bisphenol A-epichlorohydrin derived epoxy resins, bisphenol A diglycidyl ether (commonly referred to in the art as DGEBA) and bisphenol F diglycidyl ether and commercially available epoxy resins having the trade designation "EPON" (e.g., "EPON RESIN 825", "EPON RESIN 828", "EPON RESIN 1001F", "EPON RESIN 1002F", "EPON RESIN 1004F", "EPON RESIN 1009F", and "EPON RESIN 2003"), marketed by Resolution Performance Products, Houston, Tex. and many epoxy resins having the trade designation "D.E.R." (e.g., "D.E.R. 331", "D.E.R. 332", "D.E.R. 351", "D.E.R. 352", "D.E.R. 354", and "D.E.R. 356"), marketed by Dow Chemical Company, Midland, Mich.

The at least one poly(meth)acrylate is present, based on the total weight of the curable presize precursor, in an amount of from 1, 5, or 10 percent by weight up to 12, 15, 18, or even 20 percent by weight of at least one polyfunctional (meth)acrylate. The polyfunctional (meth)acrylate has an average acrylate functionality of at least two, for example, at least 3, 4, or even 5, and may be a blend of different (meth)acrylate monomers, (meth)acrylate oligomers, and/or (meth)acrylated polymers. A wide variety of (meth)acrylate monomers, (meth)acrylate oligomers, and (meth)acrylated polymers are readily commercially available, for example, from such vendors as Sartomer Company, Exton, Pa., and UCB Radcure, Smyrna, Ga. Exemplary acrylate monomers include ethylene glycol di(meth)acrylate, hexanediol di(meth)acrylate, triethylene glycol di(meth)acrylate, trimethylolpropane tri(meth) acrylate, glycerol tri(meth)acrylate, pentaerythritol tri(meth) acrylate, ethoxylated trimethylolpropane tri(meth)acrylate, neopentyl glycol di(meth)acrylate, pentaerythritol tetra (meth)acrylate, dipentaerythritol penta(meth)acrylate, sorbitol tri(meth)acrylate, sorbitol hexa(meth)acrylate, Bisphenol A di(meth)acrylate, ethoxylated Bisphenol A di(meth)acrylates, and mixtures thereof. Exemplary useful acrylate oligomers include acrylated epoxy oligomers (e.g., Bisphenol-A based epoxy acrylate oligomers such as, for example, those marketed under the trade designations "EBECRYL 3500", "EBECRYL 3600", "EBECRYL 3720", and "EBECRYL 3700" by UCB Radcure), aliphatic urethane acrylate oligomers (e.g., as marketed by UCB Radcure under the trade designation "EBECRYL 8402"), aromatic urethane acrylate oligomers, and acrylated polyesters (e.g., as marketed by UCB Radcure under the trade designation "EBECRYL 870"). Additional useful polyfunctional (meth)acrylate oligomers include polyether oligomers such as a polyethylene glycol 200 diacrylate, for example, as marketed by Sartomer Company under the trade designation "SR 259"; and polyethylene glycol 400 diacrylate, for example, as marketed by Sartomer Company under the trade designation "SR 344".

The at least one novolac resin is present, based on the total weight of the curable presize precursor, in an amount of from 1 to 5 or 10 percent. Typically, novolac resins are made by reacting a phenolic monomer (e.g., phenol, cresol, xylenol, resorcinol, catechol, bisphenol A, naphthol, or a combination thereof) with an aldehyde in the presence of an acid catalyst, with the molar ratio of the aldehyde to phenol being less than one. Examples of aldehydes used to prepare novolacs include formaldehyde, acetaldehyde, propionaldehyde, glyoxal, and furfural. Typically, these, novolac resins have a molecular weight ranging from 300 to 1,500, although higher and lower molecular weights may also be useful. Additionally, the starting phenolic monomer can be substituted with various groups such as alkyl, alkoxy, carboxyl, and sulfo, as long as there are at least two reactive sites remaining to form the novolac. Many novolac phenolic resins are readily available from commercial suppliers including, for example, Georgia Pacific Resins, Atlanta, Ga. (e.g., as marketed under the trade designations "GP 2074", "GP 5300", "GP 5833", "RESI-FLAKE GP-2049", "RESI-FLAKE GP-2050", or "RESI-FLAKE GP-2211"); Bakelite AG, Frielendorf, Germany (e.g., as marketed under the trade designation "RUTAPHEN 8656F"); Borden Chemical, Inc (e.g., as marketed under the trade designations "DURITE 423 A" or "DURITE SD 1731"). In contrast to novolac resins, resole phenolic resins tend to interfere with curing of the presize precursor, and should generally be used with discretion.

Imidazole epoxy cure catalyst, dicyandiamide, and photoinitiator are collectively present in an effective amount, that is, in an amount sufficient to enable curing of the curable presize precursor to a sufficient degree to function as a presize.

Typically, the curable presize precursor comprises from 0.5 to 2 percent by weight of imidazole epoxy cure catalyst, based on the total weight of components (a) through (f). Imidazole epoxy cure catalysts are well known and include, for example, 2-ethylimidazole, and 2-ethyl-4-methylimidazole (e.g., as marketed under the trade designation "IMICURE EMI-2,4" by Air Products and Chemicals, Allentown, Pa., and 2-propylimidazole (e.g., as marketed under the trade designation "ACTIRON NXJ-60" by Synthron, Morganton, N.C.).

Typically, the curable presize precursor comprises from 1, 2, or 5 percent up to 10, 15 or even 20 percent by weight of dicyandiamide, based on the total weight of components (a) through (f). Dicyandiamide is widely available commercially, for example, as marketed by Air Products and Chemicals under the trade designations "AMICURE CG-1200" and "AMICURE CG-1400".

Typically, the curable presize precursor comprises, based on the total weight of components (a) through (f) from 0.1, 1, or 3 percent by weight, up to 5, 7, or even 10 percent or more by weight of photoinitiator (e.g., a single photoinitiator or a combination of more than one photoinitiator). Photoinitiators useful in the practice of invention include those known as useful for photocuring free-radically polyfunctional (meth) acrylates. Exemplary photoinitiators include benzoin and its derivatives such as .alpha.-methylbenzoin; .alpha.-phenylbenzoin; .alpha.-allylbenzoin; alpha.-benzylbenzoin; benzoin ethers such as benzil dimethyl ketal (available, for example, under the trade designation "IRGACURE 651" from Ciba Specialty Chemicals, Tarrytown, N.Y.), benzoin methyl ether, benzoin ethyl ether, benzoin n-butyl ether; acetophenone and its derivatives such as 2-hydroxy-2-methyl-1-phenyl-1-propanone (available, for example, under the trade designation "DAROCUR 1173" from Ciba Specialty Chemicals) and 1-hydroxycyclohexyl phenyl ketone (available, for example, under the trade designation "IRGACURE 184" from Ciba Specialty Chemicals); 2-methyl-1-[4-(methylthio)phenyl]-2-(4-morpholinyl)-1-propanone (available, for example, under the trade designation "IRGACURE 907" from Ciba Specialty Chemicals); 2-benzyl-2-(dimethylamino)-1-[4-(4-morpholinyl)phenyl]-1-butanone (available, for example, under the trade designation "IRGACURE 369" from Ciba Specialty Chemicals). Other useful photoinitiators include pivaloin ethyl ether, anisoin ethyl ether; anthraquinones, such as anthraquinone, 2-ethylantraquinone, 1-chloroanthraquinone, 1,4-dimethylanthraquinone, 1-methoxyanthraquinone, benzanthraquinone-halomethyltriazines, and the like; benzophenone and its derivatives; iodonium salts and sulfonium salts as described hereinabove; titanium complexes such as bis(.eta.sub.5-2,4-cyclopentadien-1-yl)bis[2,6-difluoro-3-(1H-pyrrol-1-yl) phenyl]titanium (obtained under the trade designation "CGI 784 DC", also from Ciba Specialty Chemicals); halomethylnitrobenzenes such as 4-bromomethylnitrobenzene and the like; mono- and bis-acylphosphines (available, for example, from Ciba Specialty Chemicals under the trade designations "IRGACURE 1700", "IRGACURE 1800", "IRGACURE 1850", and "DAROCUR 4265").

While the above weight ranges of imidazole epoxy cure catalyst, dicyandiamide, and photoinitiator are typically useful amounts, it will be recognized that other amounts may also be used.

If desired, the curable presize precursor may include one or more epoxidized toughening agents. Useful epoxidized toughening agents include, for example, epoxidized rubber (e.g., as marketed under the trade designation "HYPOX RA1340" by CVC Specialty Chemicals), urethane rubber modified epoxy resins (e.g., as marketed under the trade designation "PACIFIC 6246 FLEXIBLE EPOXY RESIN" or "PACIFIC 6246 FLEXIBLE EPOXY RESIN HV" by Pacific Epoxy Polymers, Richmond, Mo.); and epoxidized polybutadienes (e.g., as marketed under the trade designation "OXIRON 2001" by FMC Corporation, Philadelphia, Pa., or under the trade designations "POLY BD 600E" and "POLY BD 605E" by Atofina Chemicals, Philadelphia, Pa.).

If desired, the curable presize precursor may include one or more bireactive polymerizable components, for example, compounds having at least one free-radically polymerizable group, and at least one cationically polymerizable group. Bireactive compounds can be made, for example, by introducing at least one ethylenically unsaturated group into a compound that already contains one or more epoxy groups, or, conversely, by introducing at least one epoxy group into a compound that already contains one or more ethylenically unsaturated group.

If desired, the curable presize precursor may contain a variety of additives such as, for example, fillers, thickeners, tougheners, grinding aids, pigments, fibers, tackifiers, lubricants, wetting agents, surfactants, antifoaming agents, dyes, coupling agents, plasticizers, and suspending agents.

The curable presize precursor may be formulated with low viscosity (e.g., less than 250 milliPascal-seconds). Low viscosity is useful for many common coating techniques; however, in some cases it may lead to undesired diffusion of the coating into the interior of the backing (e.g., a presize) during cure. In such cases, the curable composition may be thickened after coating by exposure to actinic radiation, prior to exposure to thermal energy.

The curable presize precursor may be applied to the synthetic woven fabric by any suitable means, including, for example, roll coating (e.g., using soft rubber rolls), spraying, transfer coating, dip coating, screen printing, gravure coating, curtain coating, bar coating, knife coating, or die coating. Typically, add on weights of the presize (i.e., after curing) are in a range of 0.1 to 400 g/m$^2$, although higher and lower coating weights may be used.

If utilizing curable presize precursors comprising solid components, they may be prepared, for example, by mixing some or all of the various materials of the curable composition in a suitable vessel at an elevated temperature, for example, less than 100° C., sufficient to liquify at least some of the materials so that they may be efficiently mixed, with stirring, to form the curable composition, but without thermally degrading the components.

The curable presize precursor may be cured by exposure to thermal energy, actinic radiation, or more typically a combination thereof. In such cases, curing of the curable composition typically begins upon exposing it to an appropriate source of actinic radiation (e.g., ultraviolet, visible, or particulate radiation), and may continue for a period thereafter. Useful forms of thermal energy include, for example, heat and infrared radiation. Exemplary sources of thermal energy include ovens, heated rolls, hot air blowers, infrared lamps, and combinations thereof. Exemplary useful sources of ultraviolet and visible radiation include mercury, xenon, carbon arc, tungsten filament lamps, and sunlight. Ultraviolet radiation, especially from a medium pressure mercury arc lamp or a microwave driven H-type, D-type, or V-type mercury lamp, such as of those commercially available from Fusion UV Systems, Gaithersburg, Md., is especially desirable. Exposure times for the actinic radiation typically range, for example, from less than about 0.01 second to 1 minute or longer providing, for example, a total energy exposure from 0.1 to 10 Joules per square centimeter ($J/cm^2$) depending upon the amount and the type of reactive components involved, the energy source, web speed, the distance from the energy source, and the thickness of the make layer to be cured. Filters and/or dichroic reflectors may also be useful, for example, to reduce thermal energy that accompanies the actinic radiation. If electron beam radiation is used, the dosage necessary is generally from less than 1 megarad to 100 megarads or more.

The backsize is typically applied to the synthetic woven fabric by coating a curable backsize precursor onto the synthetic woven fabric followed by sufficient curing (e.g., by heating) to convert the curable backsize precursor to a backsize. The backsize may comprise any material suitable as a backsize for synthetic woven fabric including, for example, an at least partially cured phenolic, aminoplast, or epoxy resin, or a combination thereof. The backsize is typically applied to the synthetic woven fabric by any suitable means, including, for example, roll coating (e.g., using soft rubber rolls), spraying, transfer coating, dip coating, screen printing, gravure coating, curtain coating, bar coating, knife coating, or die coating. Typically, add on weights of the backsize are in a range of from 0.1 to 400 $g/m^2$, although higher and lower coating weights may be used. Exemplary curable backsize precursors include filled phenol-formaldehyde resins, filled phenol-formaldehyde-latex blends, filled melamine-formaldehyde resins, and filled melamine-formaldehyde-latex blends.

To promote adhesion of presize and/or backsize to the synthetic woven fabric, the synthetic woven fabric may be modified by known methods including corona discharge, ultraviolet light exposure, electron beam exposure, flame discharge, and/or scuffing.

Typically, the woven glass fabric has a basis weight of from 2 to 20 ounces per square yard (70 to 680 $g/m^2$), for example, a basis weight of from 4 to 15 ounces per square yard (140 to 510 $g/m^2$), or even a basis weight of from 5 to 13 ounces per square yard (170 to 360 $g/m^2$); however, other basis weights may be used.

Typically, the saturant is added to the woven glass fabric at an add-on weight of from 1 to 50 percent based on the woven glass fabric weight; for example, from 10 to 30 percent based on the woven glass fabric weight, or even 15 to 25 percent based on the woven glass fabric weight, although other amounts of saturant may also be used. Examples of suitable saturants include at least partially cured thermosetting resins such as phenolic, aminoplast, or epoxy resins, and combinations thereof. Generally, the saturant is applied to the woven glass fabric as a curable saturant precursor in a substantially fluid state (optionally in a solvent), which is then at least partially cured (i.e., at least partially crosslinked) by application of energy (e.g., heat or radiation). Typically, the saturant permeates the glass woven fabric at an add-on weight (based on solids) of from 1 to 100 percent based on the woven glass fabric weight; for example, from 10 to 50 percent based on the woven glass fabric weight, or even 15 to 40 percent based on the woven glass fabric weight, although other amounts of saturant may also be used. To improve wetting and adhesion of the saturant to the woven glass fabric, the woven glass fabric may incorporate one or more surface treatments such as, for example, silane treatments. Wetting agents and surfactants may also be incorporated into the saturating resins.

Examples of thermoplastic laminating adhesives include polyamides (e.g., nylon-6 and nylon-6,6), polyimides, poly (vinyl chloride), poly(vinyl acetate), polyesters, thermoplastic polyurethanes, polyolefins (e.g., polyethylene, polypropylene, polybutylene, polybutadiene), polyacetals, polycarbonates, thermoplastic acrylic resins, natural and synthetic rubbers, and combinations thereof. The thermoplastic laminating adhesive may be conveniently used as a film having a thickness of from 1 to 10 mils (0.025 to 0.25 mm); for example, from 2 to 8 mils (0.051 to 0.20 mm), or even from 3-6 mils (0.076 to 0.15 mm), although other thickness may also be used. Further, the thermoplastic laminating adhesive may be supplied in other forms such as, for example, a molten fluid. Typically, the thermoplastic laminating adhesive is bonded to the glass and synthetic woven fabric layers using sufficient heat and/or pressure to ensure a strong adhesive bond.

The presize, backsize, saturant, and laminating adhesive may be incorporated into the backing (or any component thereof) in any suitable sequence. For example, the presize may be provided on the synthetic woven fabric before or after the backsize is provided on the synthetic woven fabric. In another example, the presize may be provided on the synthetic woven fabric before or after securing the synthetic woven fabric to the glass woven fabric.

Similarly, the abrasive layer is secured to the backing or any component thereof, before, during, or while securing, the synthetic woven fabric to the glass woven fabric by the thermoplastic laminating adhesive.

Various properties of the backing may be advantageously adjusted to provide desirable working attributes. For example, the backing should generally have sufficient breaking strength to prevent rotational failure (e.g., at least 300 pounds per inch width (53.6 kg per cm width), more typically in a range of from 800 to 2000 pounds per inch width (53.6 to 357 kg per cm width)), although this is not a requirement. Similarly, the backing should typically have a Young's modulus of at least 500,000 pounds per square inch (3500 MPa) (e.g., in a range of from 500,000 to 20,000,000 pounds per square inch (3500 to 138000 MPa)), although this is not a requirement. In addition, to facilitate operator handling the flex modulus of the laminated backing may be selected to be in a range of from 35 to 500 megapascals (MPa), more typically in a range of from 175 to 475 MPa, although this is not a requirement. To help prevent snagging and breaking, the impact resistance of the laminated backing may be at least 0.1 joule (e.g., in a range of from 0.3 to 1 joule), although this is not a requirement. Typically, the backing has a thickness of from 10 to 100 mils (0.25 to 2.5 millimeters), although this is not a requirement. The backing may optionally have additional treatments thereon such as, for example, an antistatic treatment opposite the abrasive layer.

The make and size layers may comprise any binder resin that is suitable for use in abrading applications. Many useful binder resins are known and include phenolic binders, acrylic binders, epoxy binders, isocyanurate binders, urea-formaldehyde binders, aminoplast binders, and combinations thereof. The binder resins are generally prepared by at least partially curing (i.e., crosslinking) a corresponding binder precursor; for example, free-radically polymerizable monomer and/or oligomers, epoxy resins, phenolic resins, aminoplast resins, urea-formaldehyde resins, isocyanurate resins, and combinations thereof.

The make and size layers may include other conventional components in combination with the binder such as, for example, coupling agents, fibers, lubricants, plasticizers, suspending agents, wetting agents, fillers, surfactants, grinding aids, dyes, and pigments.

Typically, the make layer is prepared by coating at least a portion of the backing (treated or untreated) with a make layer precursor. Abrasive particles are then at least partially embedded (e.g., by electrostatic coating) in the make layer precursor comprising a first binder precursor, and the make layer precursor is at least partially polymerized. Next, the size layer is prepared by coating at least a portion of the make layer and abrasive particles with a size layer precursor comprising a second binder precursor (which may be the same as, or different from, the first binder precursor), and at least partially curing the size layer precursor. The make layer precursor may be partially cured prior to coating with abrasive particles and further cured at a later point in the manufacturing process.

Abrasive particles are well known in the abrasive art and include for example, fused aluminum oxide, heat treated aluminum oxide, semi-friable aluminum oxide, white fused aluminum oxide, black silicon carbide, green silicon carbide, titanium diboride, boron carbide, tungsten carbide, titanium carbide, diamond, cubic boron nitride, garnet, fused alumina zirconia, sol gel abrasive particles, silica, iron oxide, chromia, ceria, zirconia, titania, silicates, metal carbonates (such as calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, aluminum trihydrate, graphite, metal oxides (e.g., tin oxide, calcium oxide), aluminum oxide, titanium dioxide) and metal sulfites (e.g., calcium sulfite), metal particles (e.g., tin, lead, copper), plastic abrasive particles formed from a thermoplastic material (e.g., polycarbonate, polyetherimide, polyester, polyethylene, polysulfone, polystyrene, acrylonitrile-butadiene-styrene block copolymer, polypropylene, acetal polymers, polyvinyl chloride, polyurethanes, nylon), plastic abrasive particles formed from crosslinked polymers (e.g., phenolic resins, aminoplast resins, urethane resins, epoxy resins, acrylate resins, acrylated isocyanurate resins, urea-formaldehyde resins, isocyanurate resins, acrylated urethane resins, acrylated epoxy resins), and combinations thereof.

The abrasive particles may have any size (e.g., in a size range of from 0.1 to 5000 micrometers) and may correspond to industry recognized grades such as, for example, ANSI (American National Standard Institute), FEPA (Federation of European Producers of Abrasives), or JIS (Japanese Industrial Standard). Examples of ANSI grade designations include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. Examples of FEPA grade designations include P8, P12, P16, P24, P36, P40, P50, P60, P80, P100, P120, P150, P180, P220, P320, P400, P500, P600, P800, P1000, and P1200. Examples of JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS400, JIS600, JIS800, JIS1000, JIS1500, JIS2500, JIS4000, JIS6000, JIS8000, and JIS10000.

In one method of making coated abrasive discs according to the present invention, a curable make layer precursor is applied to the presize-treated surface of the synthetic woven fabric. The basis weight (on a solids basis) of the make layer precursor utilized may depend, for example, on the intended use(s), type(s) of abrasive particles, and nature of the coated abrasive disc being prepared, but generally will be in a range of from 1, 2, or 5 to 20, 25, 400, or even 600 g/m$^2$. The make layer precursor may be applied by any known coating method for applying a make layer precursor to a backing, including, for example, roll coating, extrusion die coating, curtain coating, knife coating, gravure coating, and spray coating.

After applying the curable make layer precursor to the presize-treated surface of the synthetic woven fabric, and prior to solidification of the curable make layer precursor (e.g., by curing), abrasive particles are deposited onto the make layer precursor. Coating weights for the abrasive particles may depend, for example, on the specific coated abrasive disc desired, the process for applying the abrasive particles, and the size of the abrasive particles, but typically range from 1 to 2000 g/m$^2$. If desired, the curable make layer precursor may be partially cured prior to deposition of the abrasive particles on the make layer precursor. Following deposition of the abrasive particles, the make layer precursor is at least partially cured to provide a make layer. Curing may be accomplished by any suitable means (e.g., heat, microwave radiation, ultraviolet and/or visible radiation, electron beam), typically depending on the choice of curable make layer precursor).

A curable size layer precursor is applied onto at least a portion of the make layer and abrasive particles, and at least partially cured to provide a size layer. Curing may be accomplished by any suitable means (e.g., heat, microwave radiation, ultraviolet and/or visible radiation, electron beam), typically depending on the choice of size layer precursor). The basis weight of the size layer precursor (on a solids basis) will typically vary depending on the intended use(s), type(s) of abrasive particles, and nature of the coated abrasive disc being prepared, but generally will be in the range of from 1 or 5 g/m$^2$ to 300, or even 800 g/m$^2$, or more. The size layer precursor may be applied by any known coating method for applying a size layer to a backing including, for example, roll coating, extrusion die coating, curtain coating, and spray coating.

Optionally, a supersize may be applied to at least a portion of the size layer. The supersize may include one or more optional components in combination with the binder such as, for example, coupling agents, fibers, lubricants, plasticizers, suspending agents, wetting agents, fillers, surfactants, grinding aids, dyes, and pigments.

Abrasive discs according to the present invention may be formed by any suitable technique such as, for example, by coating disc shaped backings, or as roll or sheet form abrasive articles that are die cut to form discs.

Details concerning coated abrasive discs comprising abrasive particles and make, size, and optional supersize layers are well known and are described, for example, in U.S. Pat. Nos. 5,436,063 (Follett et al.); 5,961,674 (Gagliardi et al.); 4,751,138 (Tumey et al.); 5,766,277 (DeVoe et al.); 6,077,601 (DeVoe et al.); 6,228,133 (Thurber et al.); and 5,975,988 (Christianson), the disclosures of which are incorporated herein by reference.

Objects and advantages of this invention are further illustrated by the following non-limiting examples, but the particular materials and amounts thereof recited in these examples, as well as other conditions and, details, should not be construed to unduly limit this invention.

EXAMPLES

Unless otherwise noted, all parts, percentages, ratios, etc. in the Examples and the rest of the specification are by weight.

Swing Arm Test

The abrasive disc to be evaluated was attached to a 20.3 cm circular backup plate, commercially available as Part No. 05114145192 from 3M Company. The backup plate was then secured to a testing device obtained under the trade designation "SWING ARM TESTER" from Reel Manufacturing, Centerville, Minn., using a metal screw fastener. A 14-gauge (1.9 mm) 1010 steel disc-shaped work piece with a 30.5 cm diameter and 1.897 mm thickness was weighed and secured to the testing device with a metal fastener. During each test, the steel workpiece was applied to the abrasive article disc with a load of 2910 grams. The abrasive article disc was rotated at 3500 revolutions per minute (rpm), and the workpiece was placed against the disc at an angle of 18.5 degrees for 8 1-minute intervals, while the workpiece was rotated at 2 rpm. The amount of steel removed (total swing-arm cut) and weight loss of each abrasive disc (i.e., shelling) was recorded.

Materials

Table 1 (below) lists abbreviations used in the Examples.

TABLE 1

| ABBRE-VIATION | DESCRIPTION |
|---|---|
| AP1 | ceramic aluminum oxide abrasive particles, grade 36, made according to U.S. Pat. No. 5,611,829 (Monroe et al.), Example 7 |
| AP2 | ceramic aluminum oxide abrasive particles, grade 36, available under the trade designation "CUBITRON 324" from 3M Company, St. Paul, Minnesota, and subsequently modified such that about 1% of the total grit weight was aluminum oxide added on the surface, according to the teaching of U.S. Pat. No. 5,213,591 (Celikkaya et al.). |
| CACO | calcium carbonate, available under the trade designation "HUBERCARB Q325" from J.M. Huber Corporation, Edison, New Jersey. |
| CRY | filler, available under the trade designation "CRYOLITE TYPE RTN-C" from Koppers Trading, Pittsburgh, Pennsylvania |
| GF1 | untreated woven glass fabric, 14.23 oz/sq yd (0.483 kg/m$^2$), satin weave, 48 × 32 count, available under the trade designation "STYLE 3732", from BGF Industries, Inc., Greensboro, North Carolina |
| GF2 | GF1 treated with PR at 20 percent dry add-on weight |
| IO | iron oxide pigment |
| LA | laminating hot melt adhesive film, 116° C. softening temperature, 3 mil thickness, available under the trade designation "4220 NYLON", from Bemis Company Inc., Shirley, Massachusetts |

TABLE 1-continued

| ABBRE-VIATION | DESCRIPTION |
|---|---|
| PF | polyester fabric, 1.06 yd/lb (2.54 m/kg) polyester sateen, 101 × 43 count, available under the trade designation "POWERSTRAIT", from Milliken Corporation, Spartanburg, South Carolina |
| PR | 75% aqueous solution of phenol-formaldehyde resin having a phenol to formaldehyde ratio of 1.5-2.1:1, catalyzed with 2.5 percent potassium hydroxide |
| CY | melamine-formaldehyde crosslinker, "CYMEL 385" obtained from Cytec, West Patterson, New Jersey |
| ACR | self-crosslinking styrene-butadiene-acrylonitrile copolymer latex, 40% in water, available under the trade designation "ACRALEN BS" from Polymer Latex LTD, Worcestershire, England |
| LIT | self-crosslinking styrene-butadiene copolymer dispersion, 45% in water, available under the trade designation "LITEX S44R" from Polymer Latex S.r.l., Milano, Italy |
| OT | surfactant, available under the trade designation" "AEROSOL OT NV" from Cytec, West Patterson, New Jersey |
| S125 | defoamer, available under the trade designation "FOAMSTAR S 125" from Cognis, Cincinnati, Ohio |
| GA | grinding aid, KBF$_4$, obtained from Solvay Fluorides, LLC, Houston, Texas |
| EP1 | bisphenol A epoxy-functional material, obtained under the trade designation "EPON 828" from Resolution Performance Products, Houston, Texas |
| ACR1 | trimethylolpropane triacrylate, available under the trade designation "TMPTA-N" from UCB Radcure, Smyrna, Georgia |
| PI1 | 2-2-dimethoxy-2-phenylacetophenone, available under the trade designation "IRGACURE 651" from Ciba Specialty Chemicals, Hawthorne, New York |
| DICY | dicyandiamide, average particle size of less than 10 micrometers, available under the trade designation "AMICURE CG-1400" from Air Products and Chemicals, Allentown, Pennsylvania |
| NOV1 | novolac resin, available under the trade designation "RUTAPHEN 8656F" from Bakelite AG, Frielendorf, Germany |
| CUR1 | 2-propylimidazole, available under the trade designation "ACTIRON NXJ-60 LIQUID" from Synthron, Morganton, North Carolina |

Presize Layer

A presize layer was applied to PF by coating a composition prepared by mixing of 75 parts EP1, 10 parts ACR1, and 1 part PJ1 with a mechanical stirrer followed by heating in an oven at 50° C. for 2 hours. Then, 8 parts DICY, 5 parts NOV1, and 1 part CUR1 were added to the composition with stirring over 10 minutes. The resulting composition was coated onto PF via a conventional knife coater having a gap of 76 micrometers. The coated backing was then passed under a "FUSION D" UV source set at 118 watts/cm$^2$ at 5 m/min, followed by a thermal cure at 160-170° C. for 5 minutes. Total add-on was 112.5 g/m$^2$.

Backsize Layer

A backsize layer was applied to PF by coating a composition prepared by mixing 45 parts CACO, 1.5 parts IO, 28.5 parts PR, and 25 parts water with stirring. The resulting composition was knife coated (225 micrometer gap) onto the back side of the presize coated PF and cured in an oven at 90° C. for 60 minutes, then at 105° C. for 60 minutes. The resulting add-on was 105 g/m$^2$.

Make, Size, and Supersize Layer Precursors

The compositions of the make and size layer precursor precursors for the various Examples are reported in Table 2 (below).

TABLE 2

| COMPONENT | MAKE LAYER PRECURSOR, parts by weight | SIZE LAYER PRECURSOR, parts by weight | SUPERSIZE LAYER PRECURSOR, parts by weight |
|---|---|---|---|
| PR | 54 | 35 | 0 |
| Water | 2 | 8 | 5.4 |
| CACO | 44 | 0 | 0 |
| CRY | 0 | 55 | 0 |
| IO | 0 | 2 | 1.7 |
| CY | 0 | 0 | 18.5 |
| ACR | 0 | 0 | 9.0 |
| LIT | 0 | 0 | 1.6 |
| OT | 0 | 0 | 0.2 |
| S125 | 0 | 0 | 0.3 |
| GA | 0 | 0 | 63.3 |

Examples 1-4 and Comparative Examples A-F

Examples 1-4 and Comparative Examples A-E were prepared using amounts and ingredients as reported in Table 3. The make coat precursor was heated (pre-cured) 2 minutes at 79° C., 50 minutes at 96° C., 35 minutes at 99° C. The size layer was heated (cured) 10 minutes at 66° C., 40 minutes at 88° C., and 30 minutes at 93° C. The supersize layers were heated (pre-cured) 20 minutes at 77° C. and finally cured for 16 hours at 102° C.

Abrasive discs, 7-inch diameter×⅞-inch center hole (18 cm diameter×2.2 cm center hole), were cut from the Example coated abrasive webs and were then laminated to a secondary backing by applying a single layer of LF onto the backside of each disc, followed by the appropriate layer of secondary backing. The thus-assembled composite was then placed in a press heated to 121° C. for 30 seconds at 276 kPa pressure. After laminating, the discs were cured at 100° C. for 24 hours.

Comparative Example F was an abrasive disc commercially available as "988C" from 3M Company. This construction is a vulcanized fiber backing coated with 189 g/m² make resin, 788 g/m² API, and 536 g/m² size resin.

Examples 1-4 And Comparative Examples A-F were tested according to the Swing Arm Test. The test results, indicating Swing arm cut data, are shown in Tables 4-7.

TABLE 3

| | | | | ADD-ON WEIGHT, g/m² | | | |
|---|---|---|---|---|---|---|---|
| | PRIMARY BACKING | SECONDARY BACKING | ABRASIVE PARTICLES | MAKE LAYER | PARTICLE | SIZE LAYER | SUPERSIZE LAYER |
| EXAMPLE 1 | PF | GF2 | AP2 | 235 | 746 | 419 | None |
| COMPARATIVE EXAMPLE A | GF2 | GF2 | AP2 | 243 | 788 | 398 | None |
| EXAMPLE 2 | PF | GF2 | AP2 | 235 | 746 | 419 | 226 |
| COMPARATIVE EXAMPLE B | GF2 | GF2 | AP2 | 243 | 788 | 398 | 281 |
| EXAMPLE 3 | PF | GF2 | AP1 | 235 | 742 | 419 | None |
| COMPARATIVE EXAMPLE C | GF2 | GF2 | AP1 | 239 | 767 | 398 | None |
| EXAMPLE 4 | PF | GF2 | AP1 | 235 | 742 | 419 | 281 |
| COMPARATIVE EXAMPLE D | GF2 | GF2 | AP1 | 239 | 767 | 398 | 222 |
| COMPARATIVE EXAMPLE E | GF2 | PF | AP1 | 239 | 767 | 398 | None |

TABLE 4

| | EXAMPLE 1 | | | | COMPARATIVE EXAMPLE A | | | |
|---|---|---|---|---|---|---|---|---|
| Replicate | | | | | | | | |
| Time, minutes | 1 | 2 | 3 | average | 1 | 2 | 3 | average |
| | | | | grams | | | | |
| 1 | 42.6 | 37.4 | 41.1 | 40.4 | 42.0 | 44.0 | 41.2 | 42.4 |
| 2 | 36.2 | 37.7 | 40.1 | 38.0 | 34.7 | 34.1 | 31.4 | 33.4 |
| 3 | 29.6 | 26.8 | 30.3 | 28.9 | 29.7 | 26.6 | 29.6 | 28.6 |
| 4 | 27.9 | 22.9 | 27.7 | 26.2 | 23.3 | 24.7 | 29.3 | 25.8 |
| 5 | 27.7 | 21.2 | 25.9 | 24.9 | 22.9 | 23.2 | 19.7 | 21.9 |
| 6 | 27.7 | 18.3 | 22.0 | 22.7 | 18.1 | 15.3 | 18.3 | 17.2 |
| 7 | 25.3 | 9.5 | 22.7 | 19.2 | 17.6 | 15.9 | 19.5 | 17.7 |
| 8 | 13.4 | 7.6 | 14.6 | 11.9 | 14.3 | 17.0 | 11.6 | 14.3 |
| Total Cut | 230.4 | 181.4 | 224.4 | 212.1 | 202.6 | 200.8 | 200.6 | 201.3 |
| Mineral Loss | 4.6 | 3.2 | 3.4 | 3.7 | 4.7 | 3.3 | 4.2 | 4.1 |
| Cut/Mineral Loss Ratio | 50.1 | 56.7 | 66.0 | 57.6 | 43.1 | 60.8 | 47.8 | 50.6 |

TABLE 5

| Replicate | EXAMPLE 3 | | | | COMPARATIVE EXAMPLE C | | | | COMPARATIVE EXAMPLE F | | | |
|---|---|---|---|---|---|---|---|---|---|---|---|---|
| | 1 | 2 | 3 | average | 1 | 2 | 3 | average | 1 | 2 | 3 | average |
| Time, minutes | | | | | | grams | | | | | | |
| 1 | 40.0 | 37.3 | 43.8 | 40.4 | 41.5 | 35.0 | 32.1 | 36.2 | 22.5 | 34.4 | 31.0 | 29.3 |
| 2 | 34.8 | 30.8 | 28.4 | 31.3 | 32.5 | 23.0 | 28.0 | 27.8 | 16.5 | 29.5 | 22.6 | 22.9 |
| 3 | 27.0 | 30.3 | 27.2 | 28.2 | 24.2 | 24.3 | 22.2 | 23.6 | 16.6 | 18.8 | 19.2 | 18.2 |
| 4 | 21.3 | 25.2 | 20.6 | 22.4 | 24.7 | 19.4 | 18.8 | 21.0 | 17.4 | 16.9 | 14.5 | 16.3 |
| 5 | 19.5 | 17.6 | 14.0 | 17.0 | 21.2 | 14.2 | 6.4 | 13.9 | 12.7 | 15.3 | 15.3 | 14.4 |
| 6 | 14.9 | 13.1 | 13.4 | 13.8 | 12.7 | 6.0 | 5.6 | 8.1 | 11.4 | 16.0 | 15.1 | 14.2 |
| 7 | 9.0 | | | 9.0 | 12.5 | | | 12.5 | 11.6 | 15.2 | 10.8 | 12.5 |
| 8 | | | | | | | | | 10.4 | 13.2 | 10.1 | 11.2 |
| Total Cut | 166.5 | 154.3 | 147.4 | 156.1 | 169.3 | 121.9 | 113.1 | 134.8 | 119.1 | 159.3 | 138.6 | 139.0 |
| Mineral Loss | 3.5 | 3.0 | 3.6 | 3.4 | 4.5 | 4.1 | 4.2 | 4.3 | 2.3 | 2.4 | 2.6 | 2.4 |
| Cut/Mineral Loss Ratio | 47.6 | 51.4 | 40.9 | 46.7 | 37.6 | 29.7 | 26.9 | 31.4 | 51.8 | 66.4 | 53.3 | 57.2 |

TABLE 6

| Replicate | EXAMPLE 2 | | | | COMPARATIVE EXAMPLE B | | | |
|---|---|---|---|---|---|---|---|---|
| | 1 | 2 | 3 | average | 1 | 2 | 3 | average |
| Time, minutes | | | | | grams | | | |
| 1 | 49.0 | 41.5 | 44.9 | 45.1 | 46.9 | 37.7 | 39.3 | 41.3 |
| 2 | 43.7 | 45.5 | 43.5 | 44.2 | 39.7 | 41.6 | 32.4 | 37.9 |
| 3 | 42.5 | 44.0 | 40.5 | 42.3 | 39.0 | 33.4 | 14.8 | 29.1 |
| 4 | 39.3 | 28.8 | 33.5 | 33.9 | 31.2 | 30.0 | 5.4 | 22.2 |
| 5 | 37.6 | 26.1 | 34.3 | 32.7 | 30.0 | 28.4 | | 29.2 |
| 6 | 33.7 | 23.4 | 27.6 | 28.2 | 24.7 | 22.8 | | 23.8 |
| 7 | 30.8 | 30.1 | 26.3 | 29.1 | 21.4 | 14.2 | | 17.8 |
| 8 | 22.1 | 25.0 | 24.0 | 23.7 | 15.3 | | | 15.3 |
| Total Cut | 298.7 | 264.4 | 274.6 | 279.2 | 248.2 | 208.1 | 91.9 | 182.7 |
| Mineral Loss | 2.7 | 3.0 | 2.7 | 2.8 | 5.8 | 4.6 | 5.9 | 5.4 |
| Cut/Mineral Loss Ratio | 110.6 | 88.1 | 101.7 | 100.1 | 42.8 | 45.2 | 15.6 | 34.5 |

TABLE 7

| Replicate | EXAMPLE 4 | | | | COMPARATIVE EXAMPLE D | | | | COMPARATIVE EXAMPLE E | | |
|---|---|---|---|---|---|---|---|---|---|---|---|
| | 1 | 2 | 3 | average | 1 | 2 | 3 | average | 1 | 2 | average |
| Time, minutes | | | | | | grams | | | | | |
| 1 | 47.8 | 42.2 | 38.2 | 42.7 | 34.9 | 43.6 | 42.3 | 40.3 | 31.8 | 34.1 | 33.0 |
| 2 | 43 | 47.1 | 34.2 | 41.4 | 31.6 | 44.4 | 37.1 | 37.7 | 26.7 | 12.1 | 19.4 |
| 3 | 44.7 | 42.6 | 29.1 | 38.8 | 35.7 | 34.9 | 29.1 | 33.2 | 21.8 | 3.6 | 12.7 |
| 4 | 32.4 | 35.5 | 24.7 | 30.9 | 28.5 | 29.1 | 25.8 | 27.8 | 16.8 | | 16.8 |
| 5 | 28.7 | 33.3 | 21.2 | 27.7 | 22.7 | 24.6 | 24.0 | 23.8 | 11.2 | | 11.2 |
| 6 | 24.7 | 27.4 | 20.9 | 24.3 | 16.0 | 10.8 | 27.8 | 18.2 | 6.1 | | 6.1 |
| 7 | 28.4 | 27.1 | 20.2 | 25.2 | 5.4 | 4.2 | 19.2 | 9.6 | 3.9 | | 3.9 |
| 8 | 21.5 | 26.6 | 20.0 | 22.7 | 2.4 | | 8.1 | 5.3 | | | |
| Total Cut | 271.2 | 281.8 | 208.5 | 253.8 | 177.2 | 191.6 | 213.4 | 194.1 | 118.3 | 49.8 | 84.1 |
| Mineral Loss | 3.9 | 3.1 | 2.3 | 3.1 | 5.2 | 5.8 | 5.6 | 5.5 | 5.3 | 5.0 | 5.2 |
| Cut/Mineral Loss Ratio | 65.5 | 90.9 | 90.7 | 82.4 | 34.1 | 33.0 | 38.1 | 35.1 | 22.3 | 10.0 | 16.1 |

Various modifications and alterations of this invention may be made by those skilled in the art without departing from the scope and spirit of this invention, and it should be understood that this invention is not to be unduly limited to the illustrative embodiments set forth herein.

What is claimed is:

1. A coated abrasive disc comprising an abrasive layer secured to a backing, wherein the backing comprises:
a synthetic woven fabric having a first major surface with a presize disposed on at least a portion thereof and a second major surface opposite the first major surface and having a backsize disposed on at least a portion thereof, wherein the presize comprises a reaction product of a curable presize precursor comprising, based on the total weight of components (a) to (f): (a) from 50 to 90 percent by weight of at least one epoxy resin prepared by reaction of epichlorohydrin with at least one of bisphenol A or bisphenol F; (b) from 1 to 20 percent by weight of at least one polyfunctional (meth)acrylate; (c) from 1 to 10 percent of at least one novolac resin; and an effective amount of (d) imidazole epoxy cure catalyst, (e) dicyandiamide, and (f) photoinitiator;

a glass woven fabric permeated with an at least partially crosslinked saturant; and a thermoplastic laminating adhesive disposed between the second major surface of the synthetic woven fabric and the glass woven fabric, wherein the thermoplastic laminating adhesive secures the synthetic woven fabric to the glass woven fabric; and wherein the abrasive layer comprises a make layer, a size layer, and abrasive particles, and overlays at least a portion of the presize.

2. The coated abrasive disc of claim 1, further comprising a supersize layer overlaying at least a portion of the size layer.

3. The coated abrasive disc of claim 1, wherein the glass woven fabric has a basis weight of from 2 to 20 ounces per square yard.

4. The coated abrasive disc of claim 1, wherein the synthetic woven fabric comprises polyester.

5. The coated abrasive disc of claim 1, wherein the synthetic woven fabric has a basis weight of from 2 to 20 ounces per square yard.

6. The coated abrasive disc of claim 1, wherein the backing has a thickness of from 10 to 100 mils.

7. The coated abrasive disc of claim 1, wherein at least one of the saturant or the backsize comprises an at least partially cured phenolic, aminoplast, or epoxy resin, or a combination thereof.

8. The coated abrasive disc of claim 1, wherein the thermoplastic laminating adhesive comprises a polyamide.

9. A method of making a coated abrasive disc, the method comprising:

providing a synthetic woven fabric having a first major surface with a presize disposed on at least a portion thereof and a second major surface opposite the first major surface, wherein the presize comprises a reaction product of a curable presize precursor comprising, based on the total weight of components (a) to (f): (a) from 50 to 90 percent by weight of at least one epoxy resin prepared by reaction of epichlorohydrin with at least one of bisphenol A or bisphenol F; (b) from 1 to 20 percent by weight of at least one polyfunctional (meth)acrylate; (c) from 1 to 10 percent of at least one novolac resin; and an effective amount of (d) imidazole epoxy cure catalyst, (e) dicyandiamide, and (f) photoinitiator;

disposing a backsize on at least a portion of the second major surface;

overlaying a curable make layer precursor on at least a portion of the presize;

applying abrasive particles to the curable make layer precursor;

sufficiently curing the curable make layer precursor to provide a make layer;

overlaying a curable size layer precursor on at least a portion of the make layer and abrasive particles; and sufficiently curing the curable size layer precursor to provide a size layer;

providing a glass woven fabric permeated with an at least partially crosslinked saturant; and securing the synthetic woven fabric to the glass woven fabric with a thermoplastic laminating adhesive disposed between the second major surface of the synthetic woven fabric and the glass woven fabric.

10. The method of claim 9, wherein the synthetic woven fabric is secured to the glass woven fabric with the thermoplastic laminating adhesive before the curable make layer precursor is overlaid on at least a portion of the presize.

11. The method of claim 9, wherein the synthetic woven fabric comprises polyester.

12. The method of claim 9, wherein at least one of the saturant or the backsize comprises an at least partially cured phenolic, aminoplast, or epoxy resin, or a combination thereof.

13. The method of claim 9, wherein the thermoplastic laminating adhesive comprises a polyamide.

* * * * *

UNITED STATES PATENT AND TRADEMARK OFFICE
CERTIFICATE OF CORRECTION

PATENT NO. : 8,066,786 B2  
APPLICATION NO. : 12/018409  
DATED : November 29, 2011  
INVENTOR(S) : Steven J Keipert Page 1 of 1

It is certified that error appears in the above-identified patent and that said Letters Patent is hereby corrected as shown below:

Column 12
Line 49 (Approx.), delete "PJ1" and insert -- PI1 --, therefor.

Column 14
Line 21, delete "API," and insert -- AP1, --, therefor.

Column 15-16
Line 1 (Table 5), delete "COMPARATTVE" and insert -- COMPARATIVE --, therefor.

Signed and Sealed this
Tenth Day of April, 2012

David J. Kappos
*Director of the United States Patent and Trademark Office*